United States Patent [19]

Wilson

[11] Patent Number: 5,547,741

[45] Date of Patent: Aug. 20, 1996

[54] FLOOR COVERINGS

[75] Inventor: Gary J. Wilson, Coventry, United Kingdom

[73] Assignee: The Amtico Company Limited, United Kingdom

[21] Appl. No.: 256,037

[22] PCT Filed: Dec. 22, 1992

[86] PCT No.: PCT/GB92/02380

§ 371 Date: Jun. 21, 1994

§ 102(e) Date: Jun. 21, 1994

[87] PCT Pub. No.: WO93/13169

PCT Pub. Date: Jul. 8, 1993

[30] Foreign Application Priority Data

Dec. 23, 1991 [GB] United Kingdom .................. 9127263

[51] Int. Cl.$^6$ .............................. B32B 27/06; C08L 27/06
[52] U.S. Cl. ....................... 428/215; 428/323; 428/423.1; 428/518
[58] Field of Search ................................ 428/215, 423.1, 428/518, 323

[56] References Cited

U.S. PATENT DOCUMENTS

| | | |
|---|---|---|
| 3,678,129 | 7/1972 | Fischer . |
| 3,857,915 | 12/1974 | Crowley . |
| 3,882,191 | 5/1975 | Balatoni et al. . |
| 3,991,005 | 11/1976 | Wallace . |
| 4,337,296 | 6/1982 | Varadhachary . |
| 4,678,528 | 7/1987 | Smith et al. . |
| 4,778,547 | 10/1988 | Becker et al. . |

FOREIGN PATENT DOCUMENTS

| | | |
|---|---|---|
| 0015722 | 9/1980 | European Pat. Off. . |
| 0035825 | 9/1981 | European Pat. Off. . |
| 2195513 | 4/1974 | France . |
| 52-086441 | 7/1977 | Japan . |
| 63-156149 | 6/1988 | Japan . |
| 638118 | 5/1950 | United Kingdom . |
| 1018265 | 1/1966 | United Kingdom . |
| 1482029 | 8/1977 | United Kingdom . |
| 2053801 | 2/1981 | United Kingdom . |
| 2128931 | 5/1984 | United Kingdom . |
| WO9006970 | 6/1990 | WIPO . |

OTHER PUBLICATIONS

P. V. Foote, Review of Current Literature on the Paint and Allied Industries, vol. XL, No. 295, Jan. 1967, p. 186.

Extract from the brochure entitled "Additives and Modifiers for PVC and other plastics", published by Bayer AG, KU Business Group, Leverkusen, Germany, page entitled Baymod PU (May, 1988).

Datasheet entitled "Baymod PU", published by Bayer AG, KU Business Group, Leverkusen, Germany, page entitled Baymod PU (Sep. 1988).

*Primary Examiner*—P. C. Sluby
*Attorney, Agent, or Firm*—Dann, Dorfman, Herrell and Skillman

[57] ABSTRACT

Flexible vinyl floor coverings in which the wear layer comprises a blend of PVC, simple ester plasticizer and thermoplastic urethane polymer have improved anti-slip characteristics and good resistance to staining, abrasion and scratching. The urethane polymer is preferably an aliphatic polyester polyurethane, and it is preferably present in an amount of 5 to 40 parts by weight per 100 parts PVC resin.

21 Claims, No Drawings

FLOOR COVERINGS

FIELD OF THE INVENTION

This invention relates to vinyl floor coverings with improved anti-slip characteristics, stain resistance and scratch resistance, particularly to such coverings in sheet or tile form and especially to flexible floor coverings and to floor coverings which have a clear wear layer.

BACKGROUND OF THE INVENTION

Vinyl sheet and vinyl tile floor coverings are well-known and have enjoyed considerable commercial success. They are based on homopolymers or copolymers of vinyl chloride, for example vinyl chloride/vinyl acetate copolymers. The homopolymers and the copolymers are both commonly referred to as PVC resins or PVC polymers. Compositions which comprise PVC resin are commonly referred to as PVC compositions or simply as PVC. The amounts of the various components in a PVC composition are commonly expressed either as percentages by weight on the whole composition or as parts per hundred by weight of PVC resin (phr). PVC compositions which contain little or no plasticiser (for example up to about 2% by weight) are relatively rigid and brittle, and they are commonly referred to as rigid PVC, unplasticised PVC or UPVC. PVC compositions which contain relatively large amounts of plasticiser (for example around 10%–40% by weight or 10 to 50 phr) are more flexible and have a lower modulus, and they are commonly referred to as flexible PVC, plasticised PVC or PPVC. The plasticiser may be a simple ester plasticiser, also known as a monomeric plasticiser. Rigid and flexible PVC have significantly different properties, technology and end-uses. Vinyl sheet and vinyl tile floor coverings are based on flexible PVC.

PVC Technology, ed. W. V. Titow, Elsevier Applied Science Publishers, 4th Edition ( 1984 ), describes the manufacture, properties and uses of PVC. It uses the same terminology as that defined above. An article entitled "Vinyl Chloride Polymers" in Encyclopaedia of Polymer Science and Engineering, Wiley-Interscience, 3rd Edition, Supplement Volume (1989), pages 822–889, also describes the manufacture, properties and uses of PVC. An article entitled "Flooring Materials" in Encyclopaedia of Polymer Science and Engineering, Wiley-Interscience, 3rd edition, Volume 7 (1987), pages 233–247, describes the manufacture and uses of vinyl sheet and vinyl tile floor coverings. Vinyl sheet and vinyl tile floor coverings are usually composite materials constructed from a number of layers, each layer being specially formulated for a particular duty. The layers are generally films which are laminated together. Thus, the topmost layer, which is commonly called the wear layer, is formulated for good resistance to abrasion and wear. In one known form of construction the wear layer is transparent, so that the colouring or patterning of lower layers can be seen through it, and it may then be referred to as a clear wear layer. Flexible PVC compositions for use in a clear wear layer preferably have high clarity and transparency. It is also important that at least the upper layer of the wear layer should have good anti-slip characteristics. Known flexible vinyl floor coverings generally have good anti-slip characteristics when dry, but they may be less satisfactory when wet. Floor coverings are also known which have a wear layer of a filled PVC composition. Such filled PVC compositions contain a large amount, typically 200–500 phr, of solid fillers such as whiting and asbestos. Floor coverings of this type have good anti-slip properties, but they are not flexible and they have a matt appearance which is generally less aesthetically desirable than that of flexible floor coverings which have a clear or lightly-pigmented wear layer.

Vinyl floor coverings with a polyurethane coating are known. They are mentioned in Encyclopaedia of Polymer Science and Engineering (Wiley-Interscience) in the aforementioned article entitled "Flooring Materials" and in an article entitled "Polyurethanes" in Volume 13 (1988), pages 243–303. Such coatings are said to possess good gloss retention, stain resistance and wear characteristics. To provide such a coating, a fluid polyurethane composition is applied to the uppermost surface of the floor covering and then cured to form the coating. Curing may be effected by exposure to moist air, heat or UV radiation, depending on the particular type of polyurethane composition. These application and curing steps are additional steps in the manufacture of a floor covering, and they require specialised equipment. Such polyurethane coatings wear away in service, exposing the vinyl layer underneath. The vinyl layer so exposed has different gloss, stain-resistance, wear and anti-slip characteristics from the polyurethane coating, and this is both practically and aesthetically undesirable.

International Patent Application WO-A-90/06970 describes floor coverings in which the wear layer is preferably a blend of 60–80 parts by weight PVC resin and 20–40 parts by weight thermoplastic polyurethane. These floor coverings do not contain any phthalate plasticiser, and they are consequently stated to be less allergenic and to have greater resistance to abrasion and scuffing than known floor coverings which contain phthalate plasticisers.

Disclosure of the invention

According to the invention there is provided a floor covering having a wear layer which comprises at least one upper film layer formed of a flexible PVC composition which comprises PVC resin and 10 to 50 parts by weight per 100 parts PVC resin of a simple ester plasticiser, characterised in that the PVC composition also contains 5 to 40 parts by weight per 100 parts PVC resin of a thermoplastic polymer having urethane groups in its backbone.

The floor coverings of the invention have good anti-slip, stain-resistant, abrasion-resistant and scratch-resistant properties, and they generally have a faster indentation recovery rate than known vinyl floor coverings. They have the advantage that they can be manufactured using conventional equipment for the manufacture of vinyl floor coverings. The wear layer of the floor coverings may be lightly pigmented, but it is preferably a clear wear layer. The PVC composition of the wear layer of the floor coverings of the invention is preferably an unfilled PVC composition.

Compositions useful in the manufacture of known vinyl floor coverings typically comprise:

| | |
|---|---|
| PVC resin | 100 |
| Plasticiser | 10–50 |
| Heat stabiliser | 0.5–5 |
| UV stabiliser | 0.1–1 |
| Secondary stabiliser | 2–8 | all parts being by weight. The plasticiser may be a phthalate diester such as dioctyl phthalate. The amounts of the manor components are expressed as parts per hundred on the weight of PVC resin (phr).

The simple ester plasticisers used in the wear layer of floor coverings according to the invention may be any of those generally known in the art by that name. Such compounds may also be called monomeric plasticisers. They are organic esters with high boiling points, and in most cases they have molecular weights in the range 300 to 500. Examples of simple ester plasticisers suitable for use in the invention include phthalic diesters, phosphoric esters, esters of dibasic aliphatic acids, and trimellitic esters. The esterifying groups in such esters may be the same or different. Mixtures of more than one type of simple ester plasticiser may be used. Examples of phthalic diesters include esters of phthalic acid with one or two $C_4$ to $C_{12}$ alcohols, for example dioctyl phthalate, diisooctyl phthalate, diisononyl phthalate, diisodecyl phthalate, diisoundecyl phthalate, butyl benzyl phthalate and octyl benzyl phthalate. Examples of phosphoric esters include octyl diphenyl phosphate, isodecyl diphenyl phosphate and tritolyl phosphate. Examples of esters of dibasic aliphatic acids include dioctyl adipate, diisodecyl adipate, dioctyl azelate and dioctyl sebacate. An example of a trimellitic ester is trioctyl trimellitate.

The wear layer in a floor covering according to the invention preferably contains 15 to 40 phr, more preferably 20 to 30 phr, simple ester plasticiser.

The thermoplastic polymer having urethane groups in its backbone (the urethane polymer) is preferably a polyurethane, although it may be a polyurethaneurea. The polymer may be based on an aliphatic or aromatic polyisocyanate. It is preferably based on an aliphatic polyisocyanate, because such polymers, in particular polyurethanes, are known to have good resistance to yellowing on prolonged exposure to sunlight. Such polyisocyanates can be reacted with a polyol to form a polyurethane or with an aminoalcohol to form a polyurethaneurea. A polyurethane suitable for use in the invention is preferably based on a high molecular weight polyol, for example a polyester or polyether polyol. It is more preferably based on a polyester polyol, because such polyurethanes are known to have good resistance to sunlight and to oxidation. Polyurethanes based on polyether polyols provide good stain resistance in floor coverings according to the invention, but the coverings are more susceptible to oxidation and to degradation on exposure to sunlight.

The thermoplastic polymer having urethane groups in its backbone is preferably solid at room temperature. The polymer preferably has a softening point below the temperature at which PVC compositions are worked, that is below about 150°–200° C. The thermoplastic polymer having urethane groups in its backbone preferably has a Melt Flow Index measured according to DIN 53735 (MFI 180/5) in the range 1 to 15 g/10 min, more preferably 5 to 15 g/10 min. further preferably 5 to 10 or 10 to 15 g/10 min. The polymer is conveniently provided as a powder for blending into the PVC composition in powder form, although polymer in the form of granules or blocks suitable for addition to an intensive mixer may also be used.

The upper layer of the wear layer in a floor covering according to the invention preferably contains 10 to 30 phr, more preferably 15 to 20 phr, further preferably about 15 phr, thermoplastic polymer having urethane groups in its backbone. It has been found that the properties of the floor coverings of the invention, in particular their anti-slip properties and scratch resistance, generally improve as the proportion of the polymer is increased up to about 15 phr. It has also been found that PVC compositions containing about 20 to 30 phr simple ester plasticiser become progressively more difficult to process as the quantity of thermoplastic polymer having urethane groups in its backbone is increased above about 30 phr.

One example of a polymer having urethane groups in its backbone suitable for use in the invention is Baymod PU available from Bayer AG (Baymod is a Trade Mark). This is an plasticising polymer for PVC which is an aliphatic polyester polyurethane. The manufacturer states that it imparts improved oil, petrol (gasoline), solvent and bitumen resistance to plasticised PVC articles. Examples of such articles are said to be shoes, boots, special-purpose cables, bellows, sleeves, coatings (including hot-melt coatings), film (for example oil- and petrol-resistant sheeting and film, film for the clothing industry and low-fogging sheet for the automobile industry) and various kinds of mouldings. The manufacturer states that Baymod PU can be blended with PVC in any ratio and that more flexible materials can be produced by adding monomeric or polymeric plasticisers as well.

A composition useful in the manufacture of the upper layer of a wear layer for a floor covering according to the invention preferably additionally comprises an antioxidant to retard the ageing of the polymer having urethane groups in its backbone. Suitable antioxidants include phenolic compounds. Examples include Irganox 1010 and particularly irganox 245. (Irganox is a Trade Mark of Ciba-Geigy AG.) Irganox 1010 is believed to be pentaerythrityl-tetrakis-(3-[3',5'-di-t-butyl-4-hydroxyphenyl]propionate). Irganox 245 is believed to be 3,6-oxy-1,8-octanediyl-bis( 3-[5-t-butyl-4-hydroxy-3-methylphenyl]propionate). A suitable amount of antioxidant is about 0.1 phr based on PVC resin.

The wear layer of a floor covering according to the invention may consist of two or more, preferably two, vinyl films laminated together. In a first preferred form of construction, the wear layer consists of two upper films containing the urethane polymer laminated together. In a second preferred form of construction, the wear layer consists of at least one, preferably one, upper film containing the urethane polymer laminated to at least one, preferably one, intermediate film formed of a flexible PVC composition which contains less or no, preferably no, urethane polymer. In this latter form of construction, the upper film forms the uppermost surface of the floor covering and the intermediate film is situated immediately beneath it. The PVC composition used in the at least one intermediate film has the same preferred constitution as the PVC composition used in the upper film, except that it contains less or no, preferably no, urethane polymer. The urethane polymer used in the invention is generally more expensive per unit weight than the combination of PVC resin and simple ester plasticiser, and the second form of construction may therefore have cost advantages over the first form of construction.

The thickness of a vinyl film used in the wear layer of a floor covering according to the invention, whether as an upper film or as an optional intermediate film, is preferably in the range 125 micron to 2.5 mm (5 to 100 mil), more preferably in the range 250 micron to 1.25 mm (10 to 50 mil).

Known vinyl floor coverings commonly have Shore D hardness in the range 55 to 60, often about 58. It is known that the hardness of vinyl floor coverings can be increased by reducing the proportion of plasticiser in the wear layer and reduced by increasing it. It is also known that floor coverings with lower hardness generally have better anti-slip properties but poorer resistance to abrasion, scratching and wear, whereas floor coverings with higher hardness generally have poorer anti-slip properties but better resistance to abrasion, scratching and wear. Floor coverings of the invention in the form of a composite vinyl tile preferably have Shore D hardness in the range 50 to 55, more preferably 52 to 55, further preferably 52 to 54. Such floor coverings have surprisingly been found to have good abrasion, scratch and wear resistance as well as good anti-slip properties. The wear layer of a floor covering of the invention in the form of an isolated vinyl film or vinyl film laminate of the PVC composition comprising the thermoplastic polymer having urethane groups in its backbone preferably has Shore D hardness in the range 35 to 55, more preferably 40 to 50. The wear layers of known vinyl floor coverings in isolated form commonly have Shore D hardness in the range 55 to 60, often about 58.

The floor coverings of the invention preferably have a wet slip resistance measured by the Satra 4S method of 0.60 or higher, more preferably 0.65 or higher. The floor coverings of the invention preferably have a scratch resistance measured by the Taber method using an S-20 tool at 500 g pressure of no more then 0.90 mm. The floor coverings of the invention preferably have an abrasion resistance measured by the Taber method according to Swedish Standard SIS 92 35 09 over 2000 cycles of no more than 70 mm$^3$.

Flexible PVC compositions, which are suitable for the manufacture of the wear layer of a floor covering according to the invention and which comprise PVC, a simple ester plasticiser and a polymer having urethane groups in its backbone, can be prepared using conventional blending equipment known in PVC technology. Such compositions may also comprise other components such as pigments, processing aids, lubricants and stabilisers (for example heat and UV stabilisers and antioxidants) known in the art. They can conveniently be prepared by powder blending.

Floor coverings according to the invention can be prepared using conventional equipment for the manufacture of vinyl tile floor coverings.

A typical procedure for the manufacture of vinyl film suitable for the manufacture of vinyl floor coverings according to the invention is as follows. PVC powder, simple ester plasticiser and urethane polymer are blended in a Z-blade mixer. Other components, for example pigments, processing aids, antioxidants and stabilisers, may be blended into the mixture at the same time. In general, no pigment is added if it is desired to produce a film suitable for use as a clear wear layer. The powdery blend is then charged into an intensive mixer, for example a Banbury mixer, and worked to produce a hot melt, for example at a temperature of 140°–180° C. The melt is further worked by being fluxed on a two-roll mill heated to a similar temperature. It is then extruded between rollers to form a vinyl film having a controlled thickness, for example in the range 0.2–1.0 mm, and the film is cooled and collected on a reel.

A typical procedure for the manufacture of vinyl floor coverings is as follows. Two or more vinyl films are fed between heated nip rollers in order to fuse the films together. One or more sets of nip rollers may be used. The films may all be fed between the first set of nip rollers or one or more of the films may be introduced between later sets of nip rollers. The resulting laminated film may then be bonded to a backing fabric by passage of the film and the fabric between further heated nip rollers. The fabric may be coated with a plastisol containing a blowing agent to provide a foam layer. Alternatively, the lower face of the laminated film may be embossed to provide a roughened surface, for example by contact with a fabric carrier or a drum. The wear layer may be patterned by passage over a heated drum whose surface is the negative of the desired pattern. The resulting vinyl floor covering is then cooled and is typically cut into strips or squares ready for use. A typical laminated film might consist of one or two clear wear layers, a patterned printed layer, a white or other pigmented layer to provide visual depth to the pattern and a black layer to ensure opacity.

The floor coverings of the invention are preferably composite materials in which two or more films of different properties are laminated together. One preferred form of floor covering according to the invention has the following construction in sequential order:

(1) An upper film layer 500 to 750 micron thick of a flexible PVC composition comprising PVC resin, 10 to 50 parts by weight per 100 parts PVC resin of a simple ester plasticiser and 5 to 40 parts by weight per 100 parts PVC resin of a thermoplastic polymer having urethane groups in its backbone (a urethane polymer);

(2) A second film layer 500 to 750 micron thick of a flexible PVC composition comprising PVC resin and 10 to 50 parts by weight per 100 parts PVC resin of a simple ester plasticiser;

(3) A patterned printed layer 50 to 125 micron thick;

(4) A white or other pigmented layer 250 to 500 micron thick; and (5) A backing layer 750 to 1000 micron thick.

In one preferred embodiment, the second layer (2) is an upper film of the same composition as or similar composition to upper layer (1). In another preferred embodiment, the second layer (2) is an intermediate film of the same composition as or similar composition to upper layer (1) except that it contains no urethane polymer.

The invention is illustrated by the following Examples, in which parts and proportions are by weight unless otherwise specified:

EXAMPLE 1

A PVC composition consisting of 100 parts PVC resin, parts diisooctyl phthalate, 5 parts epoxidised soya bean oil and 2 parts stabiliser was blended as powder with a known amount (5–25 parts per 100 parts PVC resin) Baymod PU supplied by Bayer AG and with 0.1 part (per 100 parts PVC resin) Irganox 245 supplied by Ciba-Geigy AG. Baymod PU is a powdered aliphatic polyester polyurethane. The powder blend was fluxed on a 2-roll mill at 160° C. for about 5 minutes. The resulting melt was extruded between bead-blasted aluminium or siliconised paper at 158° C. and 5515 kPa (800 psi) to form a sheet uniformly 0.1–2 mm, typically 1 mm, thick.

Comparative sheets were prepared in a similar manner, but with the omission of both Baymod PU and Irganox 245.

The following results were obtained for wet slip, scratch resistance and abrasion resistance at varying levels of the polyurethane:

| Baymod PU parts | SATRA 4S Wet slip | Taber Scratch mm | Frick Taber Abrasion mm$^3$ |
| --- | --- | --- | --- |
| 0 | 0.54 | 1.27 | 104 |
| 5 | 0.59 | 1.22 | 85 |
| 10 | 0.65 | 0.89 | 70 |
| 15 | 0.70 | 0.51 | 61 |
| 20 | 0.68 | 0.38 | 74 |
| 25 | 0.70 | 0.25 | 50 |

Wet slip was measured using a 4S rubber (RAPRA specification) heel as described in M. P. Wilson, "Development of SATRA Slip Test and Tread Pattern Design Guidelines", Slips, Stumbles, and Falls: Pedestrian Footwear and Surfaces, ASTM STP 1103, B. E. Gray, Ed., American Society for Testing and Materials, Philadelphia, 1990, pp. 113–123. Taber Scratch was measured using an S-20 tool at g pressure. Frick Taber Abrasion was measured over 2000 cycles, according to Swedish Standard SIS 92 35 09.

The following results were obtained for stain resistance using a subjective test:

| Baymod PU parts | Curry powder | Boot polish |
| --- | --- | --- |
| 0 | D | D |
| 15 | B | B |

Stain resistance was recorded as a letter in the range A to E, A being the best and E the worst.

EXAMPLE 2

The following PVC composition was prepared as a powder blend:

| | |
| --- | --- |
| 100 | PVC resin |
| 26.2 | Diisooctyl phthalate (plasticiser) |
| 15 | Baymod PU aliphatic polyester polyurethane |
| 5.7 | Epoxidised soya bean oil |
| 2.5 | Heat stabiliser |
| 0.21 | UV stabiliser |
| 0.1 | Irganox 245 (antioxidant) |

The blend was fluxed on a 2-roll mill at 160° C. for about 5 minutes and then extruded to form a film 550 micron (22 mil) thick suitable for use as a clear wear layer in a composite vinyl tile. Another film was prepared in similar manner except that the composition contained no polyurethane.

Composite vinyl tiles were prepared by laminating together in the following sequence:

(1) a first clear film of the above composition (with or without Baymod PU);

(2) a second clear film of the above composition (with or without Baymod PU);

(3) a patterned printed vinyl film 75 micron (3 mil) thick;

(4) a white vinyl face ply layer pigmented with titanium dioxide 380 micron (15 mil) thick; and (5) a black vinyl backing layer pigmented with carbon black 810 micron (32 mil) thick.

The black backing layer was embossed on the underside with the pattern of a fabric carrier belt by passing it over the belt at elevated temperature.

The tiles so prepared had the following properties:

| Reference | PU in first clear film | PU in second clear film | Properties |
| --- | --- | --- | --- |
| Control | No | No | Similar to Example 1, 0 phr PU |
| 2A | Yes | Yes | Similar to Example 1, 15 phr PU |
| 2B | Yes | No | Similar to Example 1, 15 phr PU |

I claim:

1. A floor covering comprising a wear layer, said wear layer having a wear surface, said wear layer comprising at least one vinyl film, said wear surface being defined by a vinyl film formed of a flexible PVC composition which comprises (a) 100 parts by weight PVC resin, (b) from 10 to 50 parts by weight of monomeric ester plasticizer, and (c) from 5 to 40 parts by weight of a thermoplastic polymer having urethane groups in its backbone.

2. A floor covering according to claim 1, wherein the PVC composition comprises 10 to 30 parts thermoplastic polymer having urethane groups in its backbone per 100 parts PVC resin.

3. A floor covering according to claim 2, wherein the PVC composition comprises 15 to 20 parts thermoplastic polymer having urethane groups in its backbone per 100 parts PVC resin.

4. A floor covering according to claim 1, wherein the thermoplastic polymer having urethane groups in its backbone is derived from an aliphatic polyisocyanate.

5. A floor covering according to claim 1, wherein the thermoplastic polymer having urethane groups in its backbone is a polyurethane.

6. A floor covering according to claim 5, wherein the polyurethane is derived from a polyester polyol.

7. A floor covering according to claim 1, wherein the PVC composition additionally comprises an antioxidant which retards the ageing of the polymer having urethane groups in its backbone.

8. A floor covering according to claim 1, wherein the PVC composition comprises 15 to 40 parts by weight simple ester plasticiser per 100 parts PVC resin.

9. A floor covering according to claim 8, wherein the PVC composition comprises 20 to 30 parts by weight simple ester plasticiser per 100 parts PVC resin.

10. A floor covering according to claim 1, wherein the simple ester plasticiser is a diester of phthalic acid with one or more $C_4$ to $C_{12}$ alcohols.

11. A floor covering according to claim 1, wherein the wear layer is a clear wear layer.

12. A floor covering according to claim 1, wherein said vinyl film has a thickness in the range 250 micron to 1.25 mm.

13. A floor covering according to claim 1, wherein at least one other vinyl film is laminated to said vinyl film on a surface other than said wear surface.

14. A floor covering according to claim 13, wherein each said at least one other vinyl film is formed of a flexible PVC composition which comprises (a) 100 parts by weight PVC resin, (b) from 10 to 50 parts by weight of monomeric ester plasticizer, and (c) from 5 to 40 parts by weight of a thermoplastic polymer having urethane groups in its backbone.

15. A floor covering according to claim 13, wherein each said at least one other vinyl film is formed of a flexible PVC composition which comprises (a) 100 parts by weight PVC resin, (b) from 10 to 50 parts by weight of monomeric ester plasticizer, and (c) zero parts of a thermoplastic polymer having urethane groups in its backbone.

16. A floor covering according to claim 15, wherein said vinyl film is laminated to said second film.

17. A floor covering which is a laminate having the following construction in sequential order:

(1) an upper film layer 500 to 750 micron thick of a flexible PVC composition comprising PVC resin and 10 to 50 parts by weight per 100 parts PVC resin of a simple ester plasticiser wherein the PVC composition of the upper layer contains 5 to 40 parts by weight per 100 parts PVC resin of a thermoplastic polymer having urethane groups in its backbone;

(2) a second film layer 500 to 750 micron thick of a flexible PVC composition comprising PVC resin and 10 to 50 parts by weight per 100 parts PVC resin of a simple ester plasticiser;

(3) a patterned printed layer 50 to 125 micron thick;

(4) A white or other pigmented layer 250 to 500 micron thick; and (5) a backing layer 750 to 1000 micron thick.

18. A floor covering according to claim 17, wherein the PVC composition of the second film (2) comprises 5 to 40 parts by weight per 100 parts PVC resin of a thermoplastic polymer having urethane groups in its backbone.

19. A floor covering according to claim 17, wherein the PVC composition of the second film (2) contains no thermoplastic polymer having urethane groups in its backbone.

20. A floor covering according to claim 17 which has Shore D hardness in the range 50 to 55.

21. A floor covering according to claim 17, wherein said pigmented layer is a white layer which contains a white pigment.

* * * * *